United States Patent [19]

Müller

[11] 4,077,510

[45] Mar. 7, 1978

[54] GUIDE MECHANISM FOR CONVEYOR SYSTEM

[76] Inventor: Hugo Stefan Müller, Oetingerstrasse 9, Nordlingen, Germany, 8860

[21] Appl. No.: 673,197

[22] Filed: Apr. 2, 1976

[30] Foreign Application Priority Data

Apr. 12, 1975 Germany ............................ 2516151

[51] Int. Cl.² .......................................... B65G 15/62
[52] U.S. Cl. .................................. 198/840; 198/841; 198/844
[58] Field of Search ............... 198/195, 202, 840, 841, 198/844; 74/240

[56] References Cited

U.S. PATENT DOCUMENTS

| 207,626 | 9/1878 | Sargent | 198/202 X |
|---|---|---|---|
| 2,375,065 | 5/1945 | Askue | 198/202 |
| 3,231,070 | 1/1966 | Müller | 198/195 |
| 3,513,965 | 5/1970 | Miller | 198/195 |
| 3,595,380 | 7/1971 | Miller | 198/195 X |
| 3,621,986 | 11/1971 | Webb et al. | 198/195 |
| 3,669,247 | 6/1972 | Pulver | 198/195 X |
| 3,842,968 | 10/1974 | Owens | 198/195 X |
| 3,865,229 | 2/1975 | Velander | 198/195 X |
| 3,904,028 | 9/1975 | Müller | 198/195 |
| 3,944,059 | 3/1976 | Garvey | 198/195 X |
| 4,008,801 | 2/1977 | Reilly et al. | 198/841 |

*Primary Examiner*—Evon C. Blunk
*Assistant Examiner*—Richard K. Thomson
*Attorney, Agent, or Firm*—Dressler, Goldsmith, Clement, Gordon & Shore, Ltd.

[57] ABSTRACT

The conveyor system includes a guide mechanism defining longitudinally disposed sliding surfaces for guiding rib means secured to the conveyor belt for controlling vertical movement of the runs of the conveyor and in addition defines a slot for restricting lateral movement of the conveyor. This design provides accurate control of the positions of the conveyor, which thus serves to limit the space that must be provided for conveyor systems, particularly of those types that are quite long.

5 Claims, 6 Drawing Figures

U.S. Patent
March 7, 1978
4,077,510
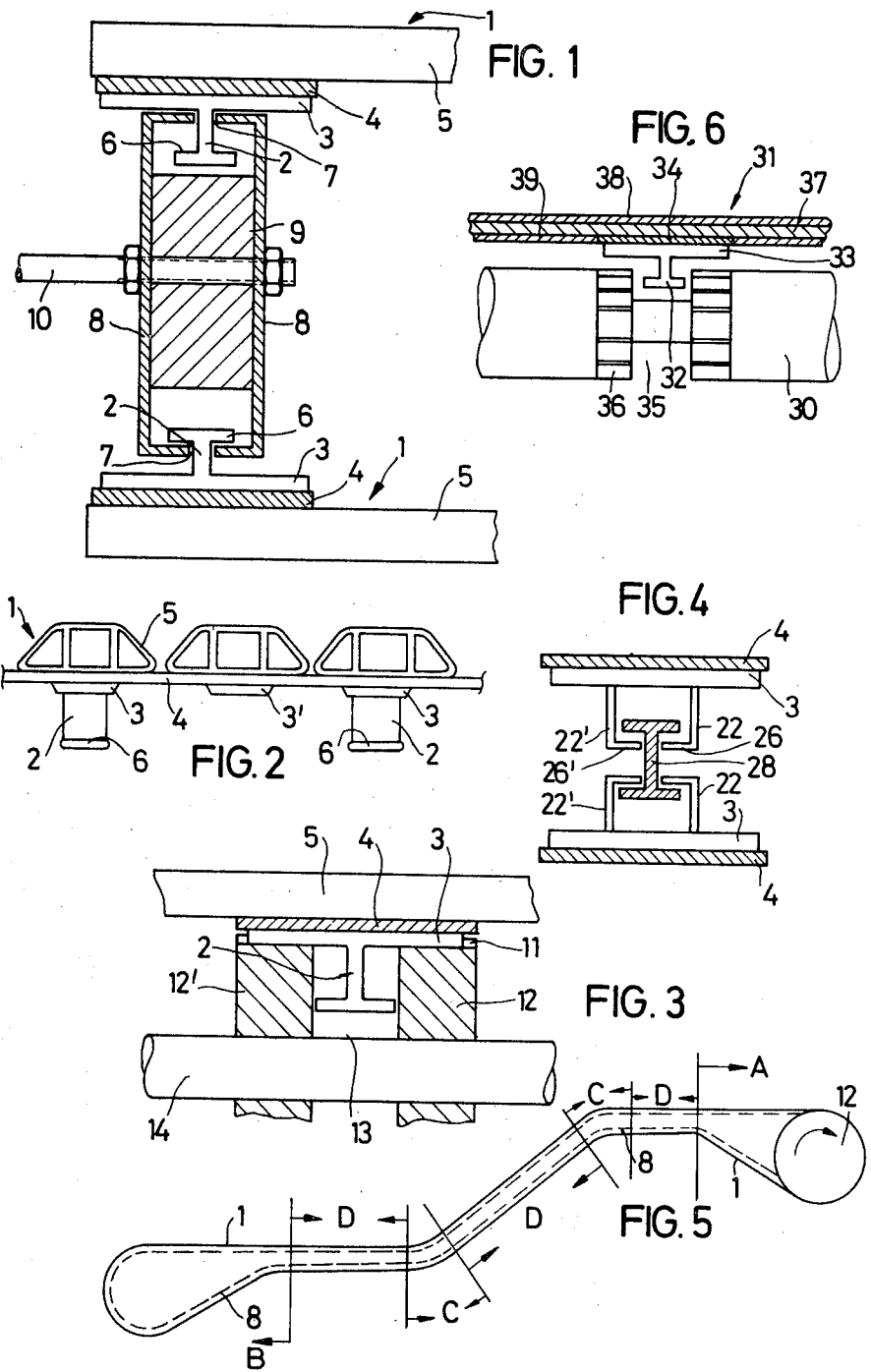

GUIDE MECHANISM FOR CONVEYOR SYSTEM

The present invention relates to an endless rotating conveyor system, particularly, a conveyor of the lattice type, comprising a conveyor belt that is guided over a drive pulley.

Lattice conveyors are known in many embodiments. A lattice conveyor of the type to which the present invention applies is one that is used in the textile industry where it conveys webs having widths of up to 15 meters. The conveyor consists of several endless lattice supports, such as belts to which the lattices for transverse conveying are fastened. Guide ribs are located below the belts adjacent each lattice, or at least at several fastening points of the lattices. The ribs extend in the direction of the lattices, that is, transverse to the direction of conveying like in a serrated belt. The drive pulley is provided with a profiling corresponding with one of these ribs to permit the ribs to be carried by the drive pulley to power drive the conveyor.

Lattice conveyors of the general type referred to above have proved to be generally satisfactory in operations. However, they still are not completely satisfactory in that they are afflicted with some basic defects in connection with the difficulties in the lateral and vertical guiding of the belt, particularly as far as its lower, loose section is concerned.

In lattice conveyors of the type to be described, like in other known types, the lower loose section of the belt easily can sag. This sagging is especially noticeable in relatively long conveyance stretches. To avoid the building height increased thereby to accommodate sagging belts, it has been found necessary to provide below the lower relatively loose section of the conveyor belt expensive supporting and bearing constructions or foundation recesses which in turn had to have a certain minimum building height and/or depth and which always acted on the surface of the conveyor belt with a sliding or rolling effect. As a result, the possibilities of creating several way conveyor belt systems which are needed, particularly in the textile industry, were limited considerably. In addition, the danger always existed that the top side on the path of the lower section could be damaged, and the gentle conveying of the sensitive textile material could no longer be assured.

In case of long conveying paths, prior art also required supporting and bearing constructions for the upper pulled section of the conveyor belt, whereby the distance of both sections could not be reduced below a certain minimum dimension. Additional expensive constructions were necessary for the lateral guiding of the belt and also in a possible curved conveyor course, such as in case of differences in the belt course. This applies particularly to a conveyor curvature opposite to the curvature of the drive pulley in the upper, conveying section. In the prior art, this latter type of design resulted in a more, or less considerable impediment of the conveying stream.

The present invention is designed to eliminate the aforementioned deficiencies of the current conveyor systems found in the prior art. This is accomplished according to the instant invention by providing below the conveyor belt at least one row of extension parts that is placed back to back in conveying direction and which has in each case a sliding surface extending parallel with the plane of the conveyor belt and is guided form-lockingly in a guide rail.

Thus, with a very simple measure, the invention allows for an excellent lateral and vertical guiding of the conveyor belt at belt courses having almost any desired curvature and over any desired length of the conveying path. In accordance with the invention the prior art belt support ribs that were designed to engage into a profiled drive pulley on the lower side of the belt are provided with extension parts, with the result that an almost ideal belt guiding results, which is optimal for all practical requirements.

The success of the invention is based on the fact that as a result of the form-locking engagement between guide rail and extension parts on at least a portion of the entire route of both the upper and lower section, traction forces are transmitted from the guide means upon the belt, which prevent a separation of the belt from the guide means. The extension parts move along the guide rail in a conveying direction, but not in the plane transverse to the conveying direction, nor in a direction vertical to the conveying surface, aside from the operating play necessary for easy movement. This novel design prevents, for example, separations of the conveyor belt from the guide means in curvatures opposite to the direction of curvature of the drive pulley, as well as guiding systems located in the conveying current of particular significance is that loosely sagging sections are eliminated. This invention makes possible any design and path guidance useful for any conveying problem, which thus no longer is adversely affected by the earlier disadvantages found in existing systems.

By applying the invention together with the ribs below the conveyor belt, it is not necessary to equip all ribs with an extension part. For example, equipped ribs may be alternated with non-equipped ribs. However, in any case, the extension parts must be narrower than the ribs, so that sufficient rib width still remains for the drive pulley, which must be recessed in the area of the extension parts.

Appropriately, those ribs which are equipped with an extension part are made from one piece. This does not result in any difference for the assembly of the lattice conveyor in relation to the earlier method. Specifically, this does not adversely affect any of the available properties of the earlier ribs.

Because of the good wear and sliding properties, graphitized polyamide, or Teflon is preferably used as material for the extension parts and for the ribs. This offers the advantage that neither terminal shafts, nor reversing, or supporting members must be specifically designed to rotate or turn to reduce friction.

A particular advantage of the invention resides in the fact that the guide rails can be designed sufficiently rigid and the entire guiding system of the lattice conveyor designed at the same time as the sole supporting system for the conveyor and can be accommodated within the conveyor belt. As a result, a minimum building height can be maintained, which is of particular importance in multi-day systems in case of limited space conditions. All stretches, uprights and holding means necessary in the area of the lattice conveyor can be maintained laterally out of the way of the conveyor stream. The guiding of the pulled and loose section of the conveyor can be very favorably constructed and supported in a guiding system, which vertically to the conveying direction is of a generally symmetrical design. In case of pre-fabricated guide system members, consisting of straight and arcuate basic construction parts, it is possible to easily build from their a construction set system.

Below, the invention is explained more in detail by way of embodiments and with the aid of the drawings, in which:

FIG. 1 shows a lattice conveyor designed according to the invention along with its guiding system, in cross section;

FIG. 2 shows the lattice conveyor according to FIG. 1 in a lateral view;

FIG. 3 shows a drive pulley appropriate for the lattice conveyor according to FIG. 1, in section;

FIG. 4 shows another embodiment of a lattice conveyor designed according to the invention in a representation analogous with FIG. 1;

FIG. 5 schematically exemplifies a curved path course of a conveyor belt; and

FIG. 6 shows in cross section another embodiment of a conveyor designed according to the invention.

In FIGS. 1 and 2, a lattice conveyor illustrates a conveyor belt 1 constructed of a multiplicity of juxtaposed lattices 5, preferably having hollow plastic profiles. Normally, these lattices or slats 5 are relatively wide, up to several meters, and are fastened to a plurality of endless belts 4 extending below the slats and located parallel with each other. One belt only, belt 4, and only some of the slats 5, can be seen in FIGS. 1 and 2. Beneath all, or some of the belts 4, but at least beneath two belts 4, longitudinal ribs 3, in alignment in each case with the slats 5, are located, preferably formed from graphitized polyamide and having possibly approximately the width of the belts. These ribs 3 form a row of teeth which with a corresponding profiling of the drive roller 12 (see FIG. 3) are in form-locking engagement, thus assuring a straight movement of belt 1.

In a preferred embodiment, the ribs 3 are fastened with the aid of rivets, which on the top side of the belts 4 are designed as snap fastener nipples, to the belt, and the slats 5 in turn are provided with bearing members with which they are fastened to the snap fastener nipples. Alternately thereto, the snap fastener nipples and the belts also may be formed from one piece by spraying them on in one operation to the belts provided with corresponding passage apertures. Such snap-fastener-like notched connections of the slats to the belts are known from prior art and therefore not shown in the drawing. Moreover, the fastening of the slats and ribs to the belt also may be of some other system, for example, the parts may be pasted, welded to each other, or be connected by continuous rivets, or the like.

One extension part 2 is located in each case on the bottom side of the ribs 3, which in the example of FIGS. 1 and 2 is of T-shaped design, and appropriately made with the ribs 3 from one piece, but it also may be an additional component, for example, with the aid of the rivets used to fasten the ribs to the belt, or it may be fastened to the ribs. This extension part 2 forms with its transverse flange 6 a sliding surface extending parallel with the plane of the conveyor belt 1 and, furthermore, it engages with its bridge into a guide rail 8 provided with a longitudinal slot 7.

The guide rail 8 may consist, for example, of two strap irons maintained at the distance of the slot 7 from each other with a support construction, or a quadrangular pipe slotted along a side (so-called C profile). FIG. 1 shows a particularly appropriate design of a guide rail 8 in the form of two "U" profiles pointing against each other, which are mounted on a base body 9, thus providing a guide means for both the lower and the upper section of the conveyor belt 1. The design according to FIG. 1 moreover offers the advantage that at the same time it forms a complete supporting construction for the conveyor belt 1 located entirely within the area embraced by the conveyor belt, thus not requiring additional space. Furthermore, it can be fastened in a simple manner, for example, with the aid of a few bolts 10, to any machine frame. The guide rail 8 according to FIG. 1, however, can be placed only with difficulties in curved tracks. Track curvatures as shown in FIG. 5, for example, can generally be made more simply from bent strap iron.

The extension parts 2 mounted at the ribs 3 have several functions. First of all, they give the conveyor belt 1, thanks to their engagement into the longitudinal slot 7 of the guide rail 8, an excellent lateral guiding, making superfluous the lateral guide panels extending laterally and used heretofore ahead of the frontal ends of the slats 5. Moreover, they give the conveyor belt 1 also a perfect vertical guidance for a curved track course of the kind shown in FIG. 5. In addition, they prevent any sagging of the lower, loose section of the conveyor belt 1, because their sliding surface seats on the inside of the guide rail 8 at the lower section.

Thus, thanks to the extension parts 2 and the guide rails 8 it is possible to put the entire conveyor belt 1 into the shape of a very flat "package" where the distance of both sections of the conveyor belt can be reduced down to the space required by the guide rails 8, without having to fear a sagging of the lower, loose section, and without requiring any additional supporting constructions in the area embraced by the conveyor belt, or above, or beneath the conveyor belt.

Moreover, thanks to the extension parts 2 and the guide rails 8, the conveyor belt 1 may be given any track curvature caused by the conveying problems, without any change in the flat shape of the conveyor belt package. An example of such a conveyor-problem-caused course of the conveyor belt is shown in FIG. 5. The track is composed from the members drive A, reversing B, curvature C, and straight section D. Any guide means 8 thereby remains within the flat package formed by the conveyor belt 1, and also the negotiating of both curvatures is tied strictly to the guide means in both the upper and the lower section, in all cases.

The embodiment according to FIG. 5 relates to the conveying between two different levels. Because no additional supporting constructions are necessary above and below the conveyor belt package, any other track curvatures also can be obtained analogously, for example, in such a manner that the conveyor belt package extends first from a lower level to an upper level and then again downward to a lower level. Then the area below the higher level of the conveyor belt is kept free for any other purposes. Until now such track courses were either impossible, or feasible only with considerable expense, but in no case was it possible to bring the conveyor belt into the shape of a flat package and to fully maintain the area below the conveyor belt available for any other purposes.

As a result of the coaction of the extension parts 2 and the guide rail 8, not only reversing rollers, supporting rollers, and the lik, become superfluous in the course of the track, but as a matter of principle, the pulley otherwise customary at the belt reversal can be dispensed with. FIG. 5 shows that even area B of the belt reversal can be formed entirely by the guide rails 8, so that major friction losses are not to be dreaded, particularly when using graphitized polyamide, or Teflon, both having excellent sliding properties. Thus, one single rotatable drive pulley 12 suffices for the entire conveyor belt. It may be designed as a serrated pulley and in cooperation with the ribs 3 it sees to it that the belt will not be pulled obliquely. Naturally, however, if desired, a customary reversing roller may be arranged in the reversing range B of the conveyor belt.

As shown in FIG. 3, the drive pulley 12 is positioned on a drive shaft 14 provided with a serration 11 into which the ribs 3 engage form-lockingly. Naturally, in this respect a recess 13 must be provided in the drive roller in the area of the serration 11 for the extension parts 2, at the ribs 3. To prevent hollowing out of this recess 13, it may be appropriate also to form the drive pulley from two parts 12 and 12' acting on the ribs 3 in each case to the right and left of the extension parts 2. A corresponding recess 13 also must be provided in the reversing roller, if one is present.

The extension parts applied to the ribs need not have by all means the shape shown in FIGS. 1 to 3. An alternate embodiment is shown in FIG. 4. There, the ribs 3 applied to the belts 4 are provided with clasp-like extension parts 22 and 22' which form a C profile together. Both transverse legs 26 and 26' of this C profile thereby seize from the side and bear on a guide rail 28 having a T profile or, in the case of the consolidation of both sections of the conveyor belt into one flat package, an I profile. The system represented in FIG. 4 thus is in a manner of speaking a reversal of the system according to FIGS. 1 to 3, while offering the same advantages and the same manner of operation. The slats located on the top side of the belts 4, by the way, are no longer shown in FIG. 4.

Generally, at each of the ribs 3 applied to the belts 4, one extension part 2 or 22 is contemplated. However, without sacrificing any efficiency, it also is possible to provide only some of the ribs, for example, only every second rib 3 with an extension part and to design the intermediate rib 3' in each case in the known manner without an extension part. Such a measure, in the manner indicated in FIG. 2 may be particularly advisable if the conveyor belt must be guided, for example, in the range of the drive pulley, or in any other range over a curvature with very low bending radius. If not all ribs are provided with extension parts, this curvature radius may be maintained smaller.

The application of the invention is not limited to lattice or slat conveyors, but offers the same advantages also in other types of conveyor belts. Thus, FIG. 6 shows a conveyor belt 31 consisting of an endless elastic web 37 which still may be coated with a top coating 38 and a running coating 39. For such conveyor belts, also called "conveyor cloths," not only a satisfactory straight running, but also an optimal lateral and vertical guide and a supporting of the lower loose section are as important as in slat conveyors.

Ribs 33 are provided in the embodiment of FIG. 6, below the running coating 39, either directly thereon, or at a belt 34 mounted about flush herein, said ribs being provided with extension parts 32 of the above-described kind. The guide rails for these extension parts are not shown in FIG. 6, instead, for reasons of improved clarity, a drive roller 30 appropriate for such conveyor 31 is shown in blown-up presentation at a distance below the conveyor belt 31. This roller 30 is of such a design that over its entire length it supports the running layer or tread 39 of the conveyor belt. In the area of the ribs 33 it has a serration 36 and within this serration there is a recess 35 for the extension parts 32, similar to what was explained already on the basis of FIG. 3.

In the embodiments described above, it was assumed, and this also is preferred in the art, that the extension parts in each case are used jointly with the ribs known from prior art and providing for the straight movement of the ribs. This need not be so; especially in the case of more narrow conveyors where an oblique movement of the belt is not to be feared so much. In this case, the ribs also may be missing, and in that situation, the extension parts are fastened directly to the belts. The same fastening means may be used for this, as they were explained before for fastening the ribs to the belts, that is, the extension parts may be pasted, welded, or riveted to the belts (whereby the upper parts of the rivets again may be designed as push button nipples, if applicable), or they may be sprayed on to the belts. Likewise, it is also possible to completely do away with the belts, with, or without the simultaneous use of the ribs, and instead connect the slats to each other, articulatedly, but traction-resistant. The extension parts and/or the ribs bearing them then are fastened directly to the slats in such a case.

What is claimed is:

1. An endless rotating relatively wide lattice type conveyor system comprising a plurality of relatively long slats disposed in a direction transverse to the direction of movement of said conveyor, a plurality of transversely spaced endless belt means secured to said slats, means for supporting and guiding said belts and associated slats to maintain said slats in tension and prevent sagging of said slats including longitudinally extending ribs generally coextensive therewith and secured to said belts having extensions integral therewith disposed within said belt means for laterally and vertically guiding said ribs and associated belt and conveyor, drive means for said conveyor including a drive pulley defining cooperating guide tracks for said extensions and in form-locking engagement therewith, a guide means assembly for said extension means located within the area embraced by said belt means for positively guiding the conveyor during its travel, said guide means defining sliding surfaces extending parallel with the plane of the conveyor belt throughout a large majority of its travel to support the active portion of the belt means and prevent sagging of the belt on its return run to the active portion and also defining guide surfaces generally normal to the plane of the conveyor for controlling transverse movement of the belt means.

2. A conveyor system as set forth in claim 1 in which the said extension means are of a T-shape design and the guide means includes members defining a longitudinal slot through which the extension means extends and an undersurface positioned to define the sliding surface for the transverse flange of the T-shaped extension means.

3. A conveyor system in accordance with claim 2 in which the guide means is constructed of two L-shaped members forming a C-profile that are secured together and define sliding surfaces adapted to be engaged by the flange of said T-shaped extension means.

4. A conveyor system as set forth in claim 1 in which the said extension means consists of an integral rib member secured to said belt means which rib is T-shaped, and the guide means defines a longitudinally extending slot through which the leg of said T for guiding same to control lateral movement thereof extends and an undersurface positioned to define the sliding surface for engagement by a lower transverse flange of the T-shaped rib to control the vertical movement of opposite portions of the belt means.

5. A conveyor system in accordance with claim 1 in which the said extension means consists of a pair of L-shaped members defining a vertical gap therebetween and the guide means is I-shaped to define sliding surfaces for the extension means secured to the opposite runs of the conveyor belt.

* * * * *